United States Patent
Seglo et al.

(10) Patent No.: US 9,511,755 B2
(45) Date of Patent: Dec. 6, 2016

(54) BRAKE MONITORING DEVICE FOR A DISC BRAKE

(75) Inventors: Fredrik Seglo, Viken (SE); Anders Larsson, Helsingborg (SE)

(73) Assignee: Haldex Brake Products AB (SE)

( * ) Notice: Subject to any disclaimer, the term of this patent is extended or adjusted under 35 U.S.C. 154(b) by 29 days.

(21) Appl. No.: 13/305,319

(22) Filed: Nov. 28, 2011

(65) Prior Publication Data
US 2012/0132488 A1    May 31, 2012

(30) Foreign Application Priority Data

Nov. 26, 2010   (DE) .................... 20 2010 015 910 U

(51) Int. Cl.
F16D 66/00    (2006.01)
B60T 17/22    (2006.01)

(52) U.S. Cl.
CPC ............... B60T 17/22 (2013.01); F16D 66/00 (2013.01); F16D 2066/003 (2013.01)

(58) Field of Classification Search
CPC .... F16D 66/023; F16D 66/026; F16D 66/028; F16D 2066/003
USPC .............................. 188/1.11 R, 1.11 E, 1.11 L
See application file for complete search history.

(56) References Cited

U.S. PATENT DOCUMENTS

| | | | |
|---|---|---|---|
| 4,356,897 A * | 11/1982 | Urban | 188/1.11 W |
| 4,658,936 A * | 4/1987 | Moseley | 188/1.11 R |
| 4,850,454 A * | 7/1989 | Korody | 188/1.11 L |
| 5,339,069 A | 8/1994 | Penner et al. | |
| 5,433,296 A | 7/1995 | Webberley | |
| 5,474,154 A | 12/1995 | Coale | |
| 6,129,183 A * | 10/2000 | Ward | 188/1.11 L |
| 6,272,914 B1 * | 8/2001 | Ciotti | 188/11 |
| 6,276,494 B1 | 8/2001 | Ward et al. | |
| 7,322,447 B2 * | 1/2008 | Deckhut et al. | 188/1.11 L |
| 7,398,141 B2 | 7/2008 | Steph et al. | |

(Continued)

FOREIGN PATENT DOCUMENTS

| | | |
|---|---|---|
| DE | 4212279 A1 | 10/1993 |
| DE | 19534854 A1 | 3/1997 |

(Continued)

OTHER PUBLICATIONS

Machine translation DE 4212279.*
European Search Report; Application No. EP 11 19 0455; Issued: Mar. 21, 2012; 2 pages.

*Primary Examiner* — Bradley King
(74) *Attorney, Agent, or Firm* — St Onge Steward Johnston and Reens LLC

(57) ABSTRACT

A brake monitoring device for sensing a value which reflects the actuation and/or release stroke of a thrust element of a brake actuating mechanism, which thrust element is guided in a housing of a brake caliper. The thrust element acts via a brake lining onto a brake disc by a lever. A sensor is configured to detect variations of a physical quantity at least one component of the brake actuating mechanism. The sensor and component are arranged such that relative movement between them generates constantly repeating variations of the physical quantity along a path. The path is formed between the component of the thrust element and the sensor in axial direction of the thrust element by means of a linear extension from the end of the thrust element facing the brake disc, axially away from the brake disc.

21 Claims, 11 Drawing Sheets

(56) References Cited

U.S. PATENT DOCUMENTS

2003/0084714 A1\* 5/2003 Chang et al. .................. 73/121
2009/0050418 A1   2/2009 Vargas et al.
2010/0170752 A1\* 7/2010 DeVlieg ................. 188/1.11 L

FOREIGN PATENT DOCUMENTS

DE   102005022597 A1   11/2006
WO      2011113554 A2    9/2011

\* cited by examiner

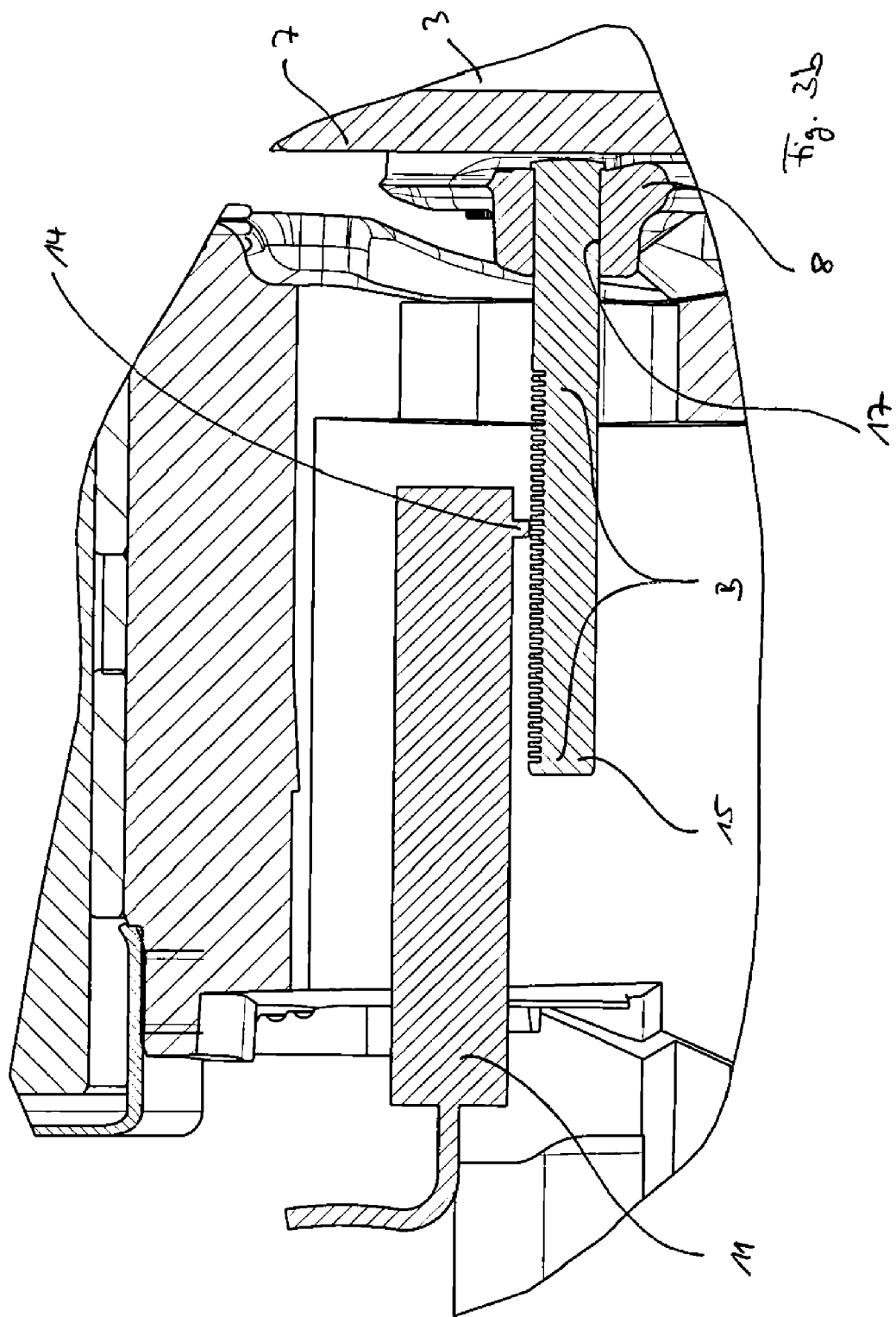

BRAKE MONITORING DEVICE FOR A DISC BRAKE

CROSS-REFERENCE TO RELATED APPLICATIONS

The present application claims priority of German Patent Application No. 20 2010 015 910.5 filed on Nov. 26, 2010, the content of which is incorporated herein by reference.

FIELD OF THE INVENTION

The present invention refers to a brake monitoring device for a disc brake as well as to a disc brake comprising such a brake monitoring device.

BACKGROUND OF THE INVENTION

In disc brakes a brake lining being arranged at the end of a thrust element is forced against a brake disc, wherein the thrust element, which is part of a brake actuating mechanism, is guided in a housing of a brake caliper. In this connection the thrust element is actuated generally via several interposed components of, among others, an adjustment mechanism by means of a lever, which lever is supported in the rear section of the housing of the brake caliper.

Accordingly, at brake actuation the thrust element performs an actuation stroke which is directed towards the brake disc. Upon release of the brake, when no more braking force is introduced, the thrust element performs a release stroke in the reverse direction, which normally is encouraged by a spring-like return mechanism. Both actuation stroke and release stroke are substantially directed parallel with the brake disc axis, since the thrust element as being part of the brake actuating mechanism is axially displaceably guided in the housing of the brake caliper by means of at least one axial guiding element.

Since, taking into consideration the thickness of the brake linings, the distances of the motion during brake actuation and brake release are known by the predefined dimensions for each embodiment of a brake actuating mechanism, a too large stroke could be used as an indicator for any kind of malfunction of the brake actuating mechanism. Reasons for a too large stroke might be due, for example, to a defect adjustment mechanism, to a too large wear of the brake linings or similar.

Likewise, a too short stroke might indicate a malfunction of the return mechanism, of the actuating cylinder or similar.

Therefore, for reasons of functional safety of the brake system and thus in the broader sense for road safety reasons it is absolutely necessary to monitor and to accordingly detect the actuation stroke and/or the release stroke in any form, since an excessive stroke either speaks for a soon to be expect breakdown of the brake actuating mechanism or indicates the necessity to replace the brake linings soon, whereas a too short stroke speaks for a soon to be expect breakdown of the return mechanism or the brake cylinder.

At present three different measurement principles are applied in the prior art.

For instance, several indicator devices provide an alarm signal to the driver or to a superior control system as soon as the stroke exceeds a predetermined length. Such indicators often are based on switch mechanisms which are controlled by magnetic or mechanic means. Although such indicator devices generally prove to be rather cheap, they however require a highly precise positioning and adjustment during their initial assembly within or at the periphery of the brake caliper on the one hand and during a later maintenance of the detection mechanisms on the other, which in turn will again increase the overall costs.

A further principle refers to the detection of the stroke which is actually present. Sensors, which are used for such a quantitative detection method, provide signals which reflect the linear motion of the brake actuating mechanism with a relatively high accuracy. However, such sensors prove to be extremely costly, in particular if only an excessive stroke shall be determined.

Embodiments of prior art monitoring devices of such kind are e.g. known from U.S. Pat. No. 5,433,296 or U.S. Pat. No. 7,398,141 B2.

A third principle refers to the measurement of the actually existing condition of the brake linings. Sensors for that purpose mainly are applied in connection with sophisticated brake control systems which are used in dynamic vehicle control and assistance systems in order to compensate the wear of the brake linings among different single brakes of the vehicle. Such sensors also prove to be too expensive if their single purpose shall be the detection of the stroke.

Configurations of prior art detection devices of this type can be found e.g. in U.S. Pat. No. 5,339,069, US 2009/0050418 A1 or DE 195 34 854 A1.

For most safety purposes, and even sometimes supported by the legislative body, it is entirely sufficient to monitor the brake stroke with a rather determined but just approximate accuracy, which does not reproduce the exact, actually existing value of the stroke; in other words, it can be completely sufficient to only provide a qualitative rather than a quantitative indication of the actually present stroke.

SUMMARY OF THE INVENTION

Based on that it is the objective of the present invention to provide a simple brake monitoring device for a disc brake which functions in a reliable and efficient way, which is cheap and easy to mount.

Such objective is solved by a brake monitoring device for a disc brake according to claim 1. Furthermore, this objective is solved by a disc brake according to claim 14

The invention refers to a brake monitoring device for sensing a value, which reflects the actuation stroke and/or the release stroke of a thrust element of a brake actuating mechanism, which thrust element is guided in a housing of a brake caliper, wherein the thrust element acts via a brake lining onto a brake disc and is actuated by a lever, comprising a sensor which is configured to detect variations of a physical quantity at least one component of the brake actuating mechanism, wherein the sensor and the component are arranged such that due to a relative movement between the sensor and the component constantly repeating variations of said physical quantity along a path are generated and detected, wherein the path is formed between the component of the thrust element and the sensor in axial direction of the thrust element.

According to the invention the path is formed by a preferably linear and longish extension which extends from the end of the thrust element facing the brake disc axially away from the brake disc.

In other words, the linearly shaped extension is arranged at the thrust element so as to move with it together in the axial direction of its movement.

The linear extension can be made as a rod or a thin metal sheet. Furthermore, the extension can be mounted to the thrust element as a separate element or be integral with it.

In one embodiment the extension, which e.g. can be made as a rod, extends into the interior of the housing of the brake caliper such that it can be freely moved in the free inner space of the housing, in fact for the entire movement of the extension which is possible due to the maximum stroke to be detected.

For that it is designed according to the invention that the sensor can be inserted into the housing of the brake caliper in an orientation parallel to the path, ideally passing a corresponding opening in the rear section of the housing of the brake caliper so that the sensor can be exchanged anytime.

In a further embodiment the rod or extension can extend from the housing of the brake caliper to the outside of it, namely also in the area of its rear section of the housing which faces away from the brake disc.

Alternatively it is however also possible that the extension traverses a section of the brake caliper in the direction to the rear end of it, wherein the section is located outside of the housing of the brake caliper. For that purpose, e.g. freely exposed wall sections can be used which are orientated in parallel to the brake disc.

In a very preferred embodiment the extension forms part of a guiding element with which the thrust element is axially guided in the housing of the caliper. In this connection the extension can be made as a rotational symmetric rod, e.g. in the form of a guide pin which comprises the repeating variations in the extend of its cylindrical surface.

In the embodiments as described above, in which the extension is at least partly located outside of the housing, the sensor is also arranged outside of and at the housing correspondingly, namely then in parallel orientation to the path as defined by the extension.

With respect to all embodiments the sensor, which shall be employed by the brake monitoring device according to the invention, is configured and arranged in such a way that it counts the number of the repeating variations in the form of pulses within a time frame for a brake actuation or for a brake release during a normal brake function. Inasmuch the number of the pulses exceeds a predetermined number of pulses, which have been previously been defined for the corresponding time frame, a warning signal is generated, which signal then is e.g. visually presented to the driver or which is then transmitted as an input signal to be computed to a superior control system which controls the entire brake system of the vehicle.

Thus, it is not necessary to exactly detect the corresponding physical quantity. Rather, it will be entirely sufficient to use a sensor for the brake monitoring device according to the invention which is able to distinguish between two well-separated quantities. Correspondingly, the sensor element which shall be embodied in the brake monitoring device only has to comprise a simple sensing architecture so that cheaper embodiments can be used.

Moreover, a particular advantage of the measuring principle, which shall be employed in the brake monitoring device according to the invention, is that no reference points or reference positions are required so that it does not become necessary to precisely position the sensor during installation and to adjust and orientate the sensor in relation to the path of the repeating variations. Also, it is not necessary to conduct an "electronic adjustment" in the superior control system or its software.

For that reason the assembly and maintenance works are substantially easier to handle in the solution according to the invention. Furthermore, a potential source of error, which could result from an imprecise positioning as this is known from other, by far more precisely functioning measurement principles, can be avoided by a system according to the invention.

The physical quantity for the constantly repeating variations can be selected from the quantities such as magnetic field, electric resistance, electric capacitance, electric inductance and/or surface structure.

Preferably, the repeating variations are uniformly and equidistantly distributed along the path.

According to the invention the repeating variations comprise geometric variations in the surface structure. Such variations along the path could be formed by grooves, recesses, teeth or projections as well as by other surface coatings.

In a further preferred embodiment the part which comprises the path is made of metal and at least one magnet is arranged in the vicinity of the constantly repeating variations in such a way that a changing magnetic field is created as a function of said constantly repeating variations. A magnetic sensor then counts the variations of the magnetic field close to the path with the repeating grooves, teeth or similar.

Alternatively, the path comprises a series of permanent magnets which will then be detected by a corresponding sensor.

Often brake actuating mechanisms comprise automatic brake adjusters for the compensation of the brake lining wear. First of all, the sensor for the brake monitoring device according to the invention shall be mounted and configured so as to be able to sense the relative movement between the sensor element and the path in the brake assembly during brake actuation. However, as already mentioned afore, the used measuring principle does not require any reference points. Therefore, the sensor could be also attached to a component which moves both during brake actuation and during adjustment for the lining wear as well. A further advantage of the brake monitoring device according to the invention is that for that purpose it is not necessary to detect the brake condition in addition, i.e. whether the brake is actuated or not.

For the latter purpose it is beneficial to use means which generates a pulse of special strength, e.g. of double intensity, wherein said means is located somewhere near the end of the path in order to warn or inform the driver or a superior system that the overall stroke has reached a value which reflects the condition of almost completely worn brake linings. Correspondingly, the path for the repeating variations comprises at least an additional irregular variation for determining a specific position and condition, respectively, of the actuating stroke and/or release stroke, whereby the position stands for a critical wear condition of the brake lining.

Moreover, such an irregular variation could be also used as an indicator for an exceptionally extra-long stroke which is hazardous with respect to safety and functioning. By means of such a simple principle the superior control system does not have to exclusively rely on its monitoring software algorithms as programmed for such an incident.

For example, if grooves are used as the variations in the course of the path such irregularity can be provided by a groove which has a double width as compared to the remaining grooves, for which the sensor thus will create a stronger pulse.

As this becomes apparent from the afore-mentioned embodiments, the brake monitoring device according to the invention proves to be very easy and cost efficient in general. It functions in a reliable way since no complicated algorithms are needed for the signal processing. The brake monitoring device can be used in conjunction with disc brakes of any kind and can be installed in all kind of vehicles, ranging from passenger cars to heavy load vehicles, trucks, busses and trailer. Due to the very simple measuring principle which transmits the simplified conditions of the actuating and the release stroke, respectively, which exceed a predefined threshold, to the driver or a control system, an installation of the brake monitoring device according to the invention in a substantial number of vehicles contributes to an overall improved road safety.

Since the sensor of the brake monitoring device is arranged in the rear section of the housing of the brake caliper, in that in one embodiment it is inserted into a corresponding opening there or in that in another embodiment it is attached entirely outside of the housing at its rear, it is a substantial advantage that the sensor element is not exposed to the high temperatures which occur near the brake disc. By inserting the sensor into the free interior of the housing of the brake caliper or outside of its rear section, assembly, cable fixations, inspection, exchange and maintenance prove to be very simple.

It is also possible in an easy way to retrofit existing disc brakes with the brake monitoring device according to the invention. An existing thrust element for a brake mechanism of a disc brake can be exchanged by a thrust element which comprises a corresponding extension, without incurring substantial costs for that, since an exchange can be performed during the next regular maintenance.

Further advantages and features of the invention can be seen from the following description of the embodiments as shown in the accompanying drawings.

DETAILED DESCRIPTION OF THE INVENTION

Figure 1:
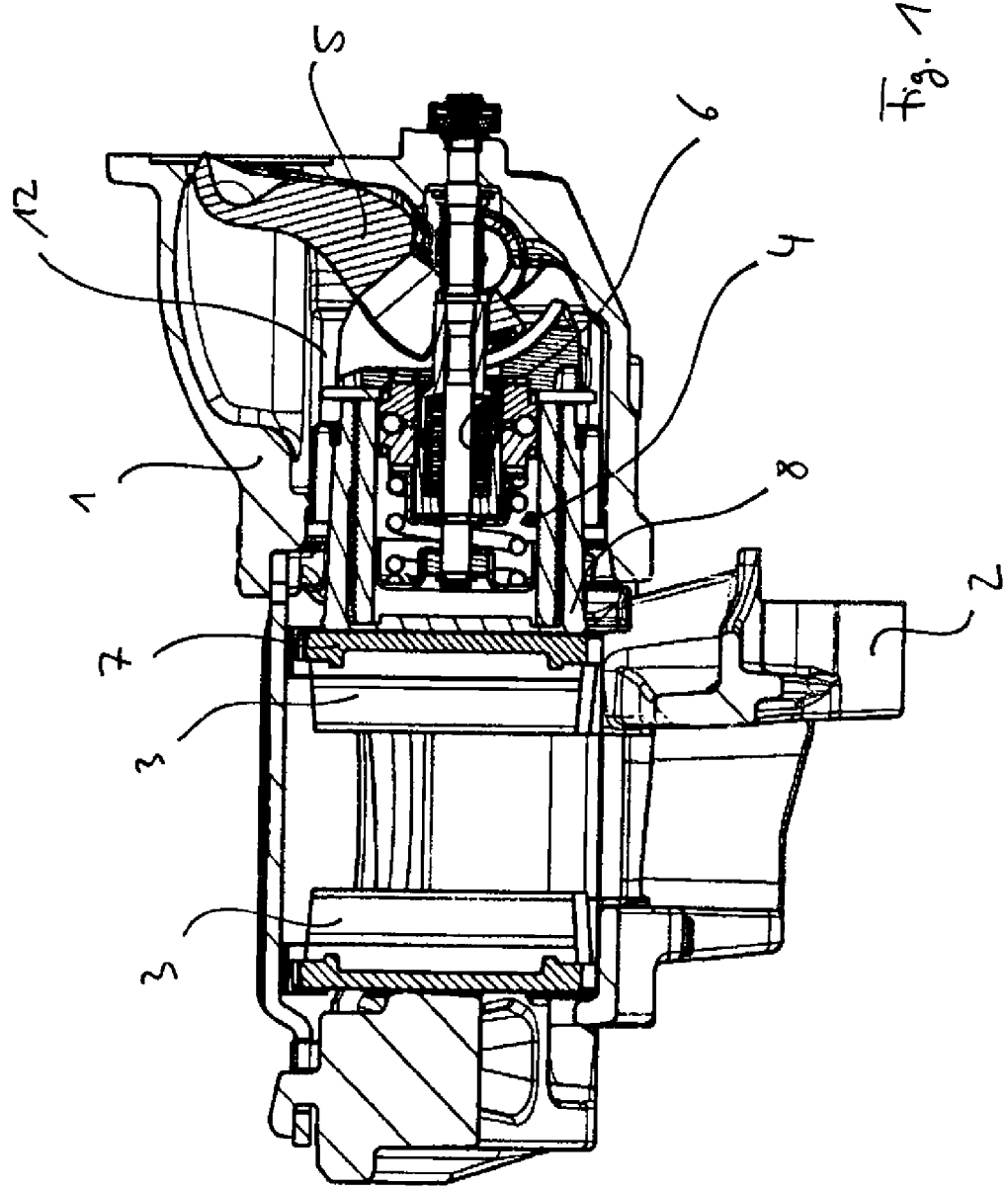
FIG. 1 shows a lateral cross section view of a disc brake with a brake actuating mechanism.

As an example, FIG. 1 shows a disc brake in a lateral cross section view.

The disc brake comprises a brake caliper 1, in the present case a sliding caliper, which is displaceably guided on a carrier 2. The brake caliper 1 surrounds a brake disc, not shown here, at both sides of which brake linings 3 do engage.

As it is disclosed e.g. in the International patent application WO 2011/113554 A2 of the applicant, to which it is explicitly referred to herewith, a brake actuating mechanism 4 is arranged and axially displaceably guided in the housing of the brake caliper 1. The brake actuating mechanism 4 is actuated by a lever 5 which is pivotably supported in the rear section of the housing of the brake caliper 1, i.e. in the section facing away from the brake disc.

By pivoting the lever 5 the brake actuating mechanism 4 is moved in a direction towards the brake disc in order to clamp the brake linings 3.

The brake actuating mechanism 4 comprises an adjustment mechanism 6, not explained in further detail herein. A thrust element 8 of the brake actuating mechanism 4 and of the adjustment mechanism 6, respectively, engages with a brake pad holder 7. The thrust element 8 engages at least partly with the brake pad holder 7 in a planar manner at the brake disc side. For example, it can extend itself laterally like a trapeze in order to induce the force into the brake pad holder 7 more uniformly.

Figure 2:
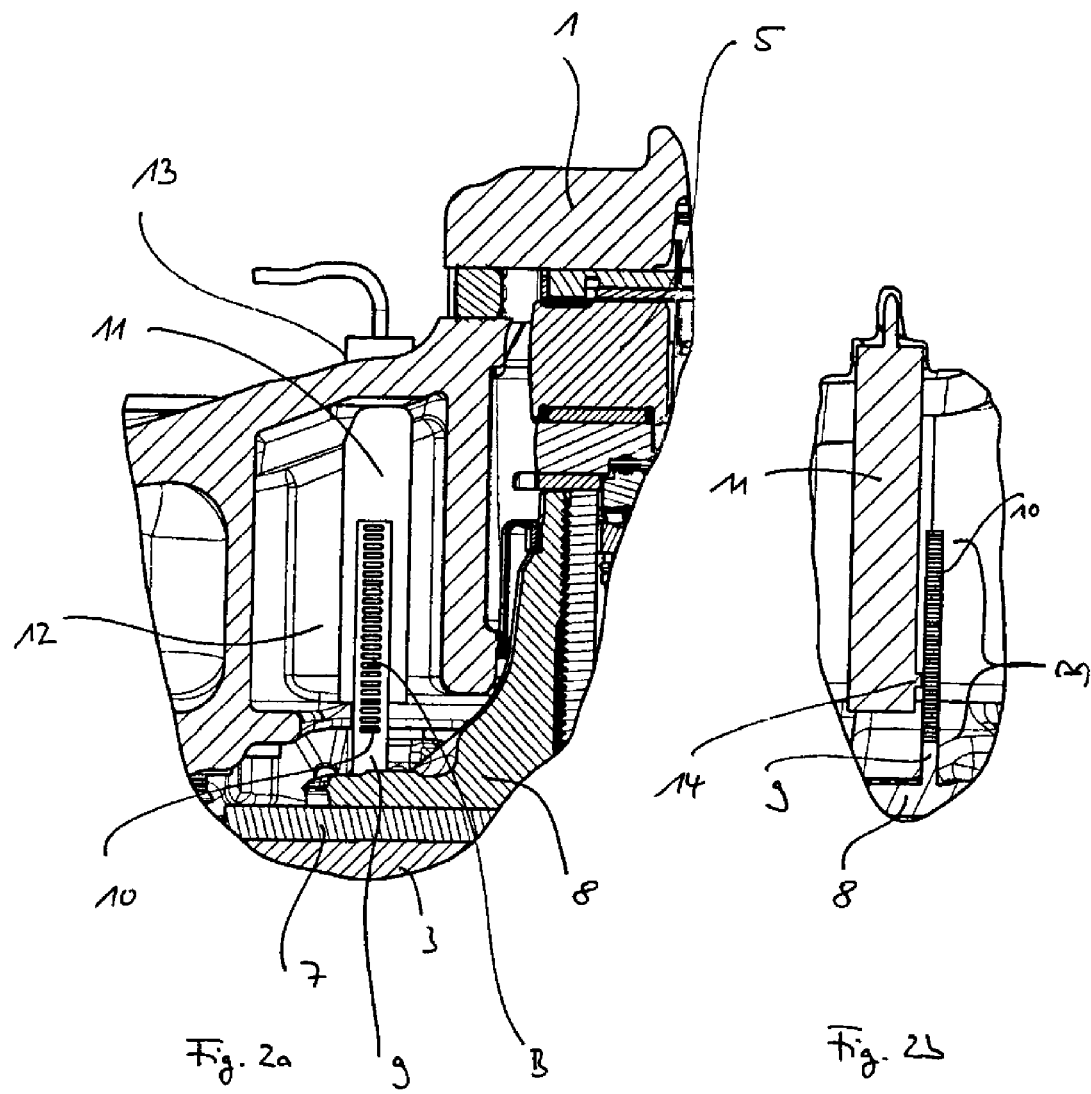
FIG. 2a partly shows a cross section view from above of a brake monitoring device in a first embodiment according to the invention.
FIG. 2b partly shows a lateral cross section view of this brake monitoring device according to the invention.

FIGS. 2a and 2b do show a first embodiment of the brake monitoring device according to the invention.

It comprises a rod-like linear extension 9, which is arranged at the thrust element 8 in such a manner that it extends away from the thrust element 8, opposite to the brake disc, in parallel to the axis of the brake disc.

In this embodiment the extension 9 extends into the free interior 12 of the housing of the brake caliper 1 such that it can move in this interior 12 without barriers over the maximum possible axial movement of the thrust element 8 which depends on the stroke.

The extension 9 of this shown embodiment is made in one-piece with the thrust element 8 and could be preferably made in one casting process.

The extension 9 defines a linear path B with constantly repeating variations of a physical quantity, in the present case a series of uniformly spaced apart recesses or grooves 10.

In parallel arrangement to the extension 9 of the thrust element 8 a sensor 11 is inserted through a rear opening 13 into the housing of the brake caliper 1 such that these constantly repeating variations 10 can be sensed upon the axial actuating or return motion of the thrust element 8, since the extension 9 passes along the sensor 11 and the path B moves along the gauge head 14 of the stationarily supported sensor 11.

The fixation of the position of the sensor 11 in the free interior 12 of the housing of the brake caliper 1 and thus its parallel orientation with a slight distance relative to the extension 9 is exclusively achieved by the fixation of the housing of the sensor 11 in the opening 13 of the brake caliper 1, which opening 13 is configured for that accordingly. One can think for that purpose of correspondingly sealed plug connections, which are not shown in further detail.

Figure 3:
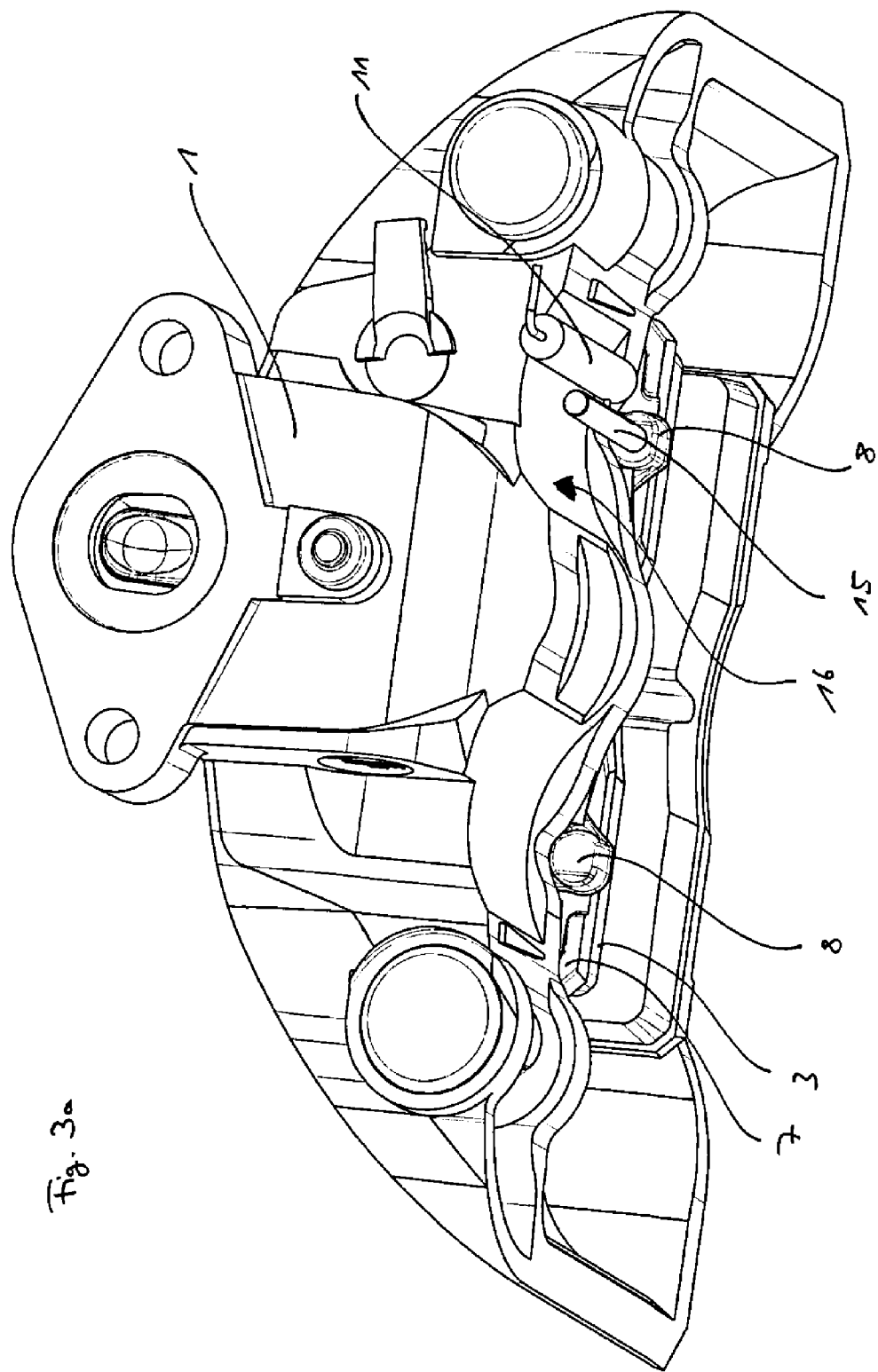
FIG. 3a shows a perspective view of a brake caliper of a disc brake with a brake monitoring device in a second embodiment according to the invention.
FIG. 3b partly shows a lateral cross section view of this brake monitoring device in the second embodiment.
FIG. 3c partly shows the brake monitoring device in the second embodiment.
Figure 3C:
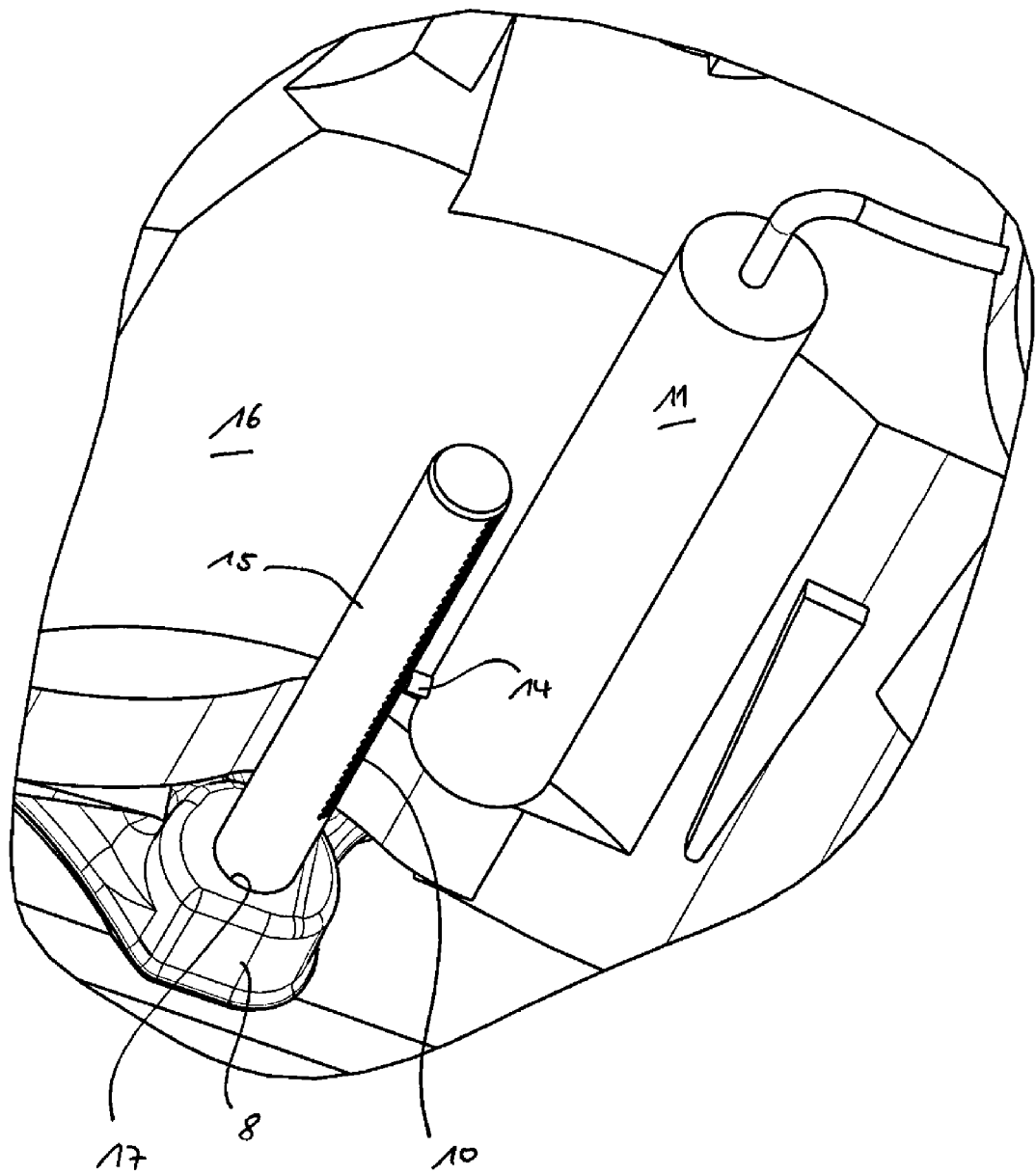

FIGS. 3a-3c show a second embodiment of the brake monitoring device according to the invention.

In this embodiment the extension 15 is formed as a cylindrical rod and extends away from the brake disc, outside and below of the housing of the brake caliper 1 and thus outside of the free interior 12 of the brake caliper 1.

A free space 16 is provided in the lower section of the brake caliper 1, whereby the extension 15 can linearly move inside said free space 16 subject to the movement of the thrust element 8.

As can be seen from FIG. 3b, at the brake disc side, the extension 15 is received by an opening 17 in the thrust element 8 by a press-fit and covered by the brake pad holder 7 upon assembly of the brake lining 3.

By means of not shown fixation mechanisms the sensor 11 can be fixed in the free space 16 below the housing of the brake caliper 1 in parallel orientation to the extension 15 and to the path B defined by it, as it is shown in FIG. 3c.

Figure 4A:
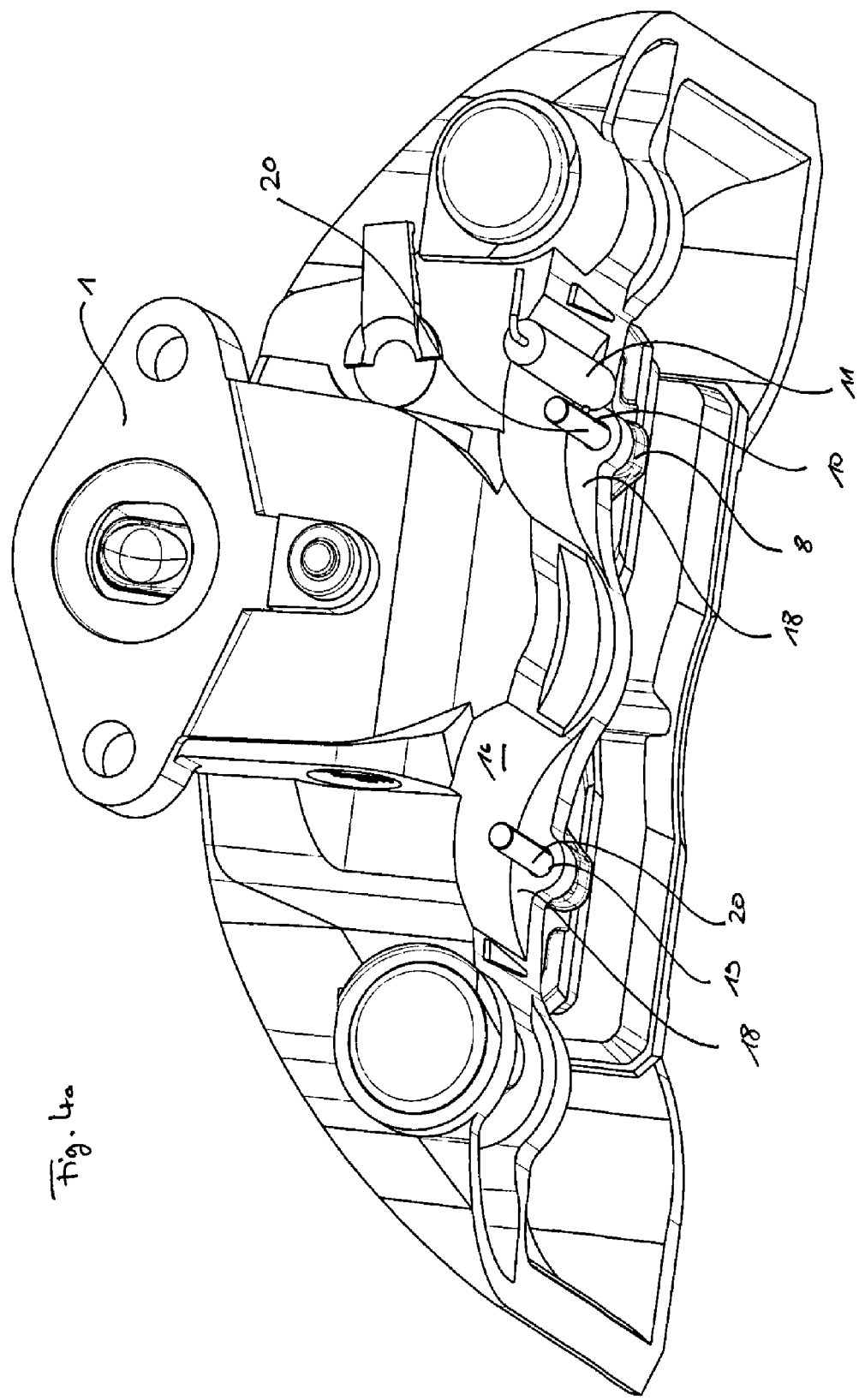
FIG. 4a shows a perspective view of a brake caliper of a disc brake with a brake monitoring device in a third embodiment according to the invention.
Figure 4B:
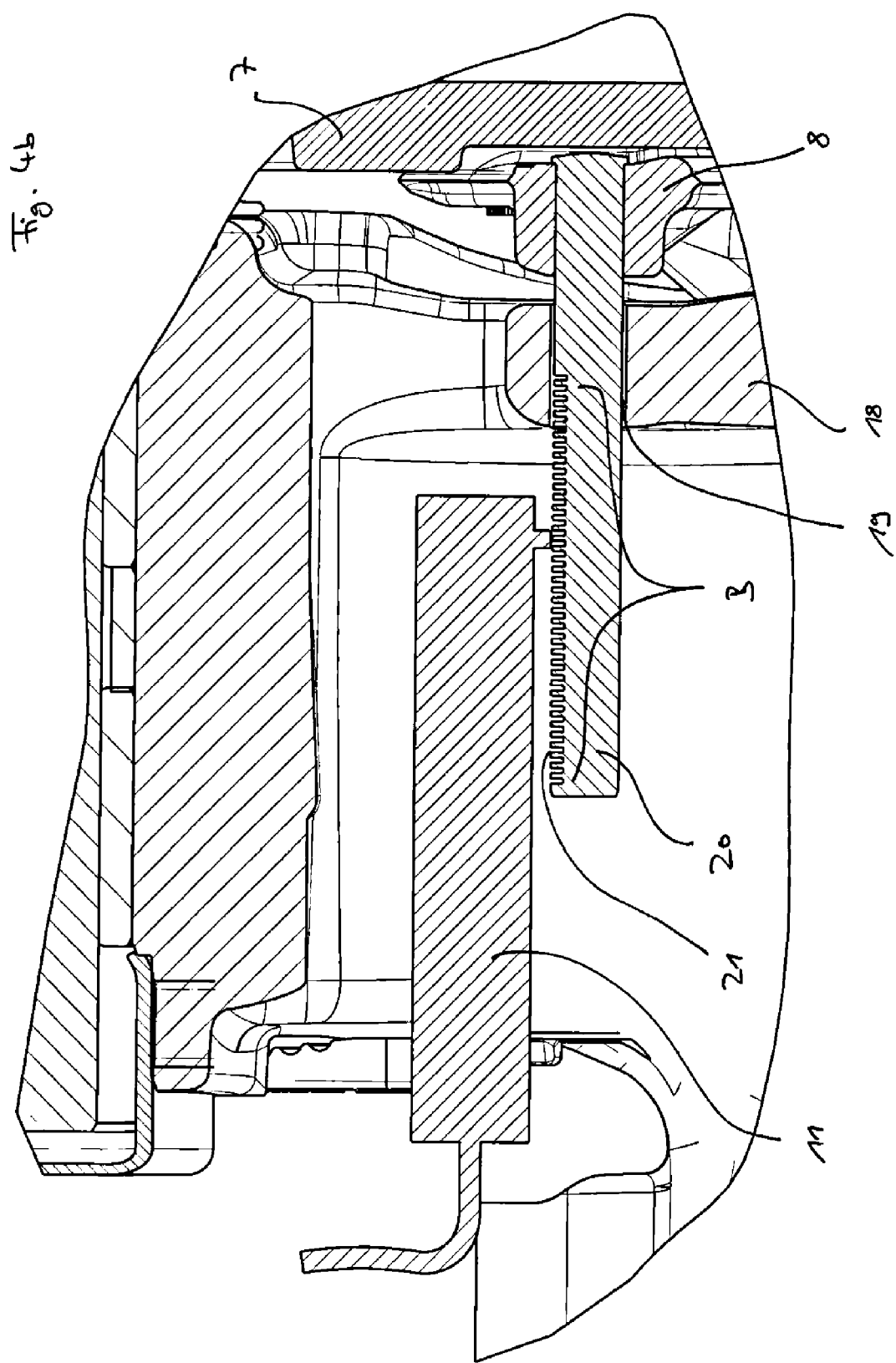
FIG. 4b partly shows a lateral cross section view of this brake monitoring device in the third embodiment.
Figure 4C:
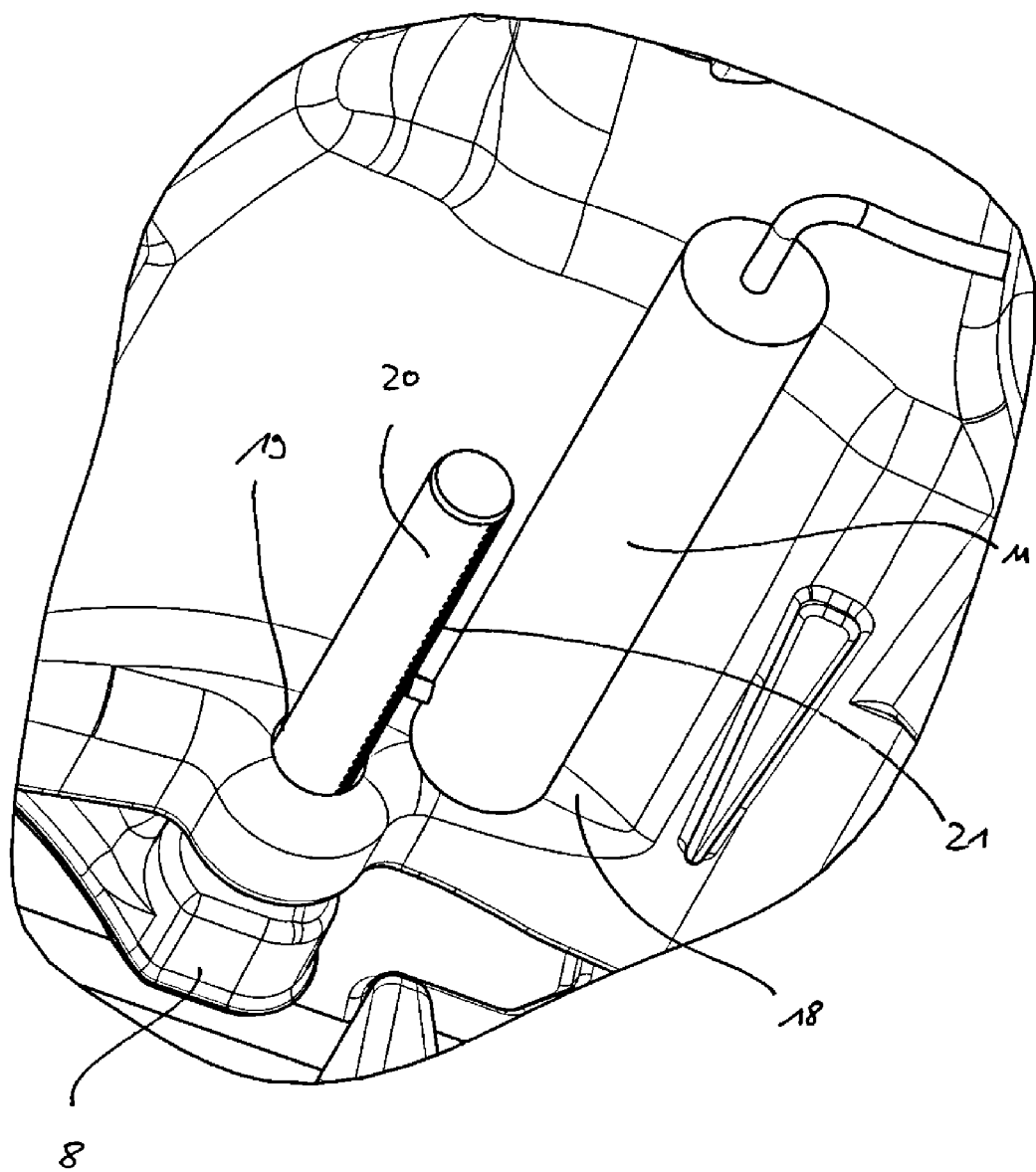
FIG. 4c partly shows the brake monitoring device in the third embodiment.

A further embodiment is shown in FIGS. 4a-4c.

The brake caliper 1 comprises at both sides and below its housing flange-like wall sections 18 which limit the free spaces 16 towards the brake disc. In the wall sections 18 slide openings 19 are provided, respectively.

Cylindrically rod-like guiding elements in the form of guide pins 20 are fixed to the thrust element 8 by press-fit as mentioned above and received in the sliding openings 19 with such a clearance that an axial guidance of the thrust element 8 in direction towards the brake disc and away of it is enabled.

A guide pin 20 comprises several recesses 21 in series and in equal distances on its cylindrical surface which recesses 21 define the path B which passes along the gauge head 14 of the sensor 11.

For all described embodiments the longitudinal movement of the extensions 9,15 and 20, respectively, in both directions correlates with the corresponding clamping motion of the brake actuating mechanism at braking and the corresponding return motion of the brake actuating mechanism at release of the brake.

Figure 5:
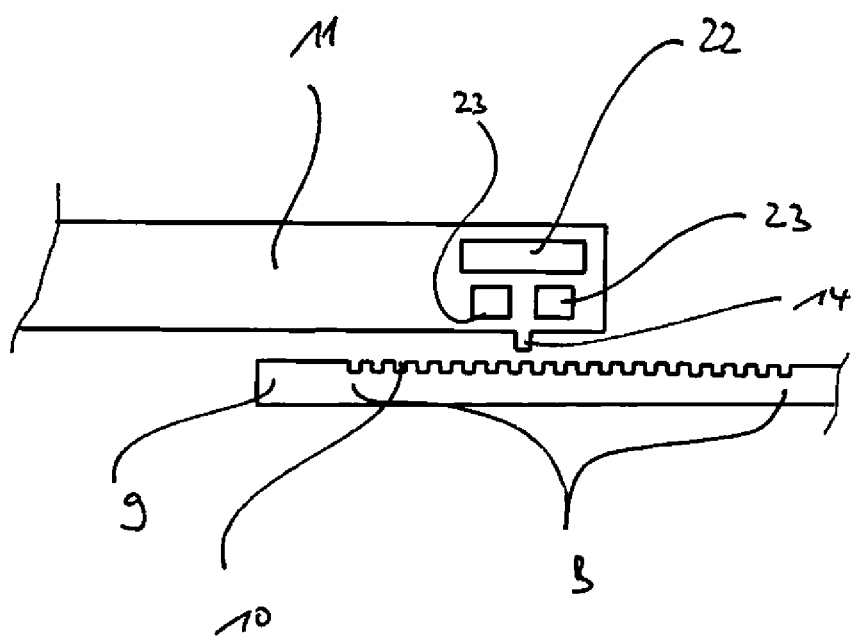
FIG. 5 schematically shows a brake monitoring device with a magnetic measurement principle.

In FIG. 5 schematically the construction of the brake monitoring device using a measurement principle being based on the Hall effect is shown.

For that purpose at least one permanent magnet 22 is arranged in the housing of the sensor 11, which generates a magnetic field which will vary as a function of the series of grooves 10 of the extension 9. This variation can be detected by means of Hall elements 23 which are arranged in the housing of the sensor 11 and thus the number of the grooves 10 is counted as pulses. The sensor 11 is entirely mounted and exchanged, respectively, as a module, if applicable, with its integrated components Hall elements 23 and permanent magnet 22.

Figure 6:
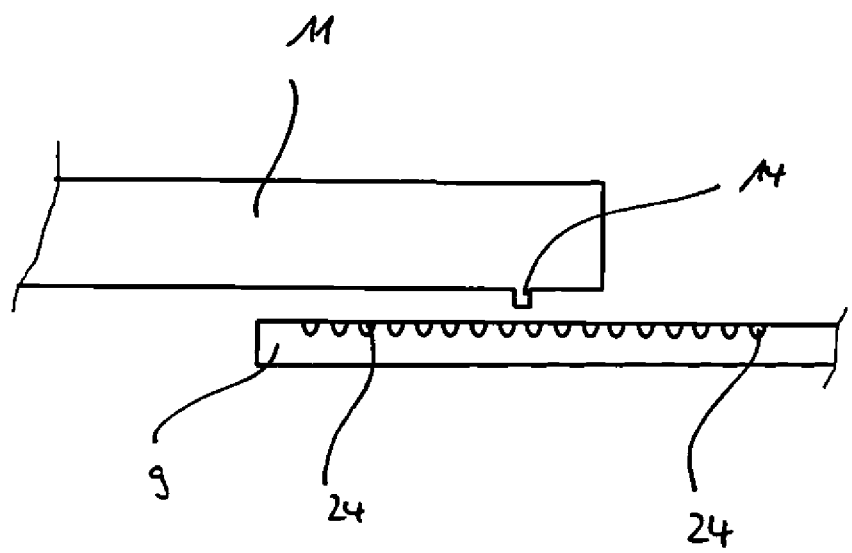
FIG. 6 schematically shows an extension for a brake monitoring device with integral permanent magnets.

An alternative embodiment of the extension 9 is shown in FIG. 6, in which in regular distances small permanent magnets 24 are integrated in it.

In order to further facilitate the signal processing of the brake monitoring device the respective end positions of the path B of the series of the variations of the physical quantities could be defined according to the invention. These end positions correspond then to the critical condition of the stroke motion in both possible directions, respectively, so that a corresponding warning signal could be created.

Figure 7:
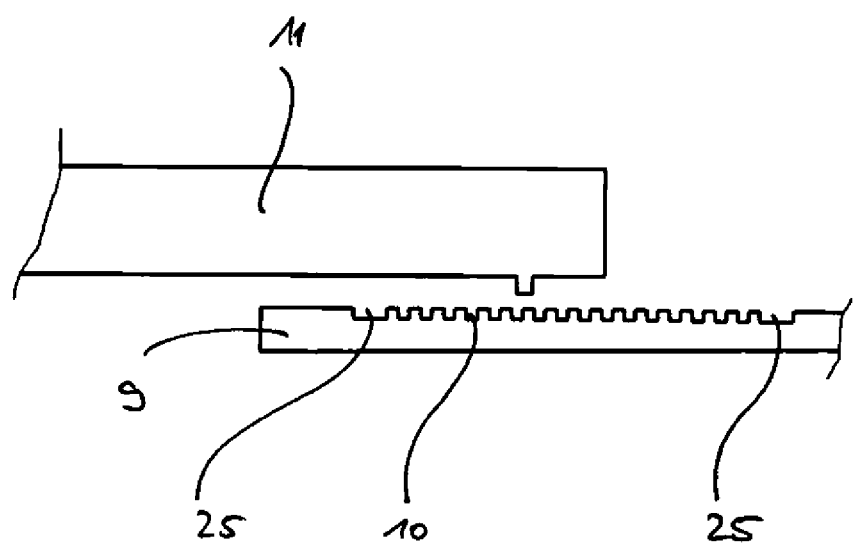
FIG. 7 schematically shows an extension for a brake monitoring device with defined end positions of the path.

For that purpose, as shown in FIG. 7, e.g. the respective end position is defined by a groove 25, which comprises a double width when compared to the remaining grooves 10 of the path B so that a signal of differing strength could be generated which will be detected by the sensor system, accordingly.

What is claimed is:

1. A brake monitoring device comprising:
    a sensor which is configured to detect variations of a physical quantity at at least one component of the brake actuating mechanism of a disc brake, wherein the sensor and the component are arranged such that, due to a relative movement between the sensor and the component, constantly repeating variations of the physical quantity along a path are generated and detected, and
    a linear extension which is configured as the component to cooperate with a thrust element of the brake actuating mechanism, the extension extending from the thrust element and parallel to an axis of the disc brake, the extension being disposed entirely exterior to the sensor, the sensor extending into an interior of a housing of a brake caliper of the disc brake through an aperture in a rear side of the brake caliper opposite to the thrust element, the sensor being disposed within the housing in an orientation parallel to the axis of the disc brake and disposed parallel to and distant away from the extension thereby forming the path;
    wherein the extension is attached to the thrust element.

2. The brake monitoring device according to claim 1, wherein the physical quantity for the constantly repeating variations is selected from a group of quantities consisting of magnetic field, electric resistance, electric capacitance, electric inductance and surface structure.

3. The brake monitoring device according to claim 2, wherein the path comprises constantly repeating variations in a form of geometric variation.

4. The brake monitoring device according to claim 3, wherein the geometric variations are formed from at least one of grooves, teeth, projections or surface coatings.

5. The brake monitoring device according to claim 3, wherein at least one magnet is arranged in the vicinity of the constantly repeating variations such that a varying magnetic field is generated as a function of the constantly repeating variations.

6. The brake monitoring device according to claim 2, wherein the path comprises a series of permanent magnets.

7. The brake monitoring device according to claim 1, wherein the physical quantity further comprises at least one irregular variation for determining a specific position of an actuation stroke and/or release stroke, wherein the specific position indicates a critical wear condition of a brake lining.

8. A disc brake comprising:
    a brake actuating mechanism with a thrust element, the thrust element being guided in a housing of a brake caliper, wherein the thrust element acts via a brake lining onto a brake disc and is actuated by a lever; and
    a brake monitoring device for detecting a value which reflects an actuation stroke and/or a release stroke of the thrust element, the brake monitoring device having a sensor which is configured to detect variations of a physical quantity at at least one component of the brake actuating mechanism;
    wherein the sensor and the component are arranged such that, due to a relative movement between the sensor and the component, constantly repeating variations of the physical quantity along a path are generated and detected;
    wherein the path is formed between the component of the thrust element and the sensor in an axial direction of the thrust element, the component comprising a linear extension which extends from an end of the thrust element away from the brake disc into an interior of the housing of the brake caliper and parallel to an axis of the disc brake, so as to be moveable in the interior of the housing and disposed entirely exterior to the sensor, wherein the sensor extends into the interior of the housing of the brake caliper, the sensor being disposed within the housing in an orientation parallel to the axis of the brake disc and disposed parallel to and distant away from the extension;

wherein the extension is attached to the thrust element.

9. The disc brake according to claim 8, wherein the extension is integral with the thrust element.

10. The disc brake according to claim 8, wherein the physical quantity for the constantly repeating variations is selected from a group of quantities consisting of magnetic field, electric resistance, electric capacitance, electric inductance, and surface structure.

11. The disc brake according to claim 10, wherein the path comprises constantly repeating variations in a form of geometric variations.

12. The disc brake according to claim 11, wherein the geometric variations are formed from at least one of grooves, teeth, projections, or surface coatings.

13. The disc brake according to claim 11, wherein at least one magnet is arranged in the vicinity of the constantly repeating variations such that a varying magnetic field is generated as a function of the constantly repeating variations.

14. The disc brake according to claim 10, wherein the path comprises a series of permanent magnets.

15. The disc brake according to claim 8, wherein the physical quantity further comprises at least one irregular variation for determining a specific position of an actuation stroke and/or release stroke, wherein the specific position indicates a critical wear condition of a brake lining.

16. A brake monitoring device comprising:
a sensor which is configured to detect variations of a physical quantity at at least one component of the brake actuating mechanism of a disc brake, wherein the sensor and the component are arranged such that, due to a relative movement between the sensor and the component, constantly repeating variations of the physical quantity along a path are generated and detected, and a linear extension which is configured to cooperate with a thrust element of the brake actuating mechanism, the extension extending from the thrust element in a direction away from the disc brake and out of a housing of a brake caliper, the extension being disposed parallel to an axis of the disc brake, the sensor being fixed outside the housing of the brake calliper, proximate to the linear extension, and in an orientation parallel to the axis of the disc brake and disposed parallel to and distant away from the extension thereby forming the path;

wherein the physical quantity further comprises at least one irregular variation for determining a specific position of an actuation stroke and/or release stroke, wherein the specific position indicates a critical wear condition of a brake lining.

17. The brake monitoring device according to claim 16, wherein the extension is part of a guiding element for axial guidance of the thrust element in the housing of the brake caliper.

18. The brake monitoring device according to claim 16, wherein the extension is configured to be attached to the thrust element.

19. The brake monitoring device according to claim 16, wherein the physical quantity for the constantly repeating variations is selected from a group of quantities consisting of magnetic field, electric resistance, electric capacitance, electric inductance and surface structure.

20. The brake monitoring device according to claim 18, wherein the path comprises constantly repeating variations in a form of geometric variations.

21. The brake monitoring device according to claim 18, wherein the path comprises a series of permanent magnets.

* * * * *